US009456466B2

(12) United States Patent
Dai et al.

(10) Patent No.: US 9,456,466 B2
(45) Date of Patent: Sep. 27, 2016

(54) METHOD, DEVICE AND SYSTEM FOR CONTROLLING AUXILIARY INFORMATION ABOUT USER EQUIPMENT

(71) Applicant: ZTE CORPORATION, Shenzhen, Guangdong Province (CN)

(72) Inventors: Qian Dai, Shenzhen (CN); Parolari Sergio, Shenzhen (CN); Yingqi Xu, Shenzhen (CN); Yunpeng Cui, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/396,083

(22) PCT Filed: Jul. 9, 2013

(86) PCT No.: PCT/CN2013/079074
§ 371 (c)(1),
(2) Date: Oct. 22, 2014

(87) PCT Pub. No.: WO2013/185662
PCT Pub. Date: Dec. 19, 2013

(65) Prior Publication Data
US 2015/0327321 A1  Nov. 12, 2015

(30) Foreign Application Priority Data

Jul. 20, 2012  (CN) .......................... 2012 1 0253304

(51) Int. Cl.
*H04W 76/04* (2009.01)
*H04W 76/06* (2009.01)
(Continued)

(52) U.S. Cl.
CPC ........... *H04W 76/046* (2013.01); *H04W 28/02* (2013.01); *H04W 28/08* (2013.01); *H04W 76/048* (2013.01); *H04W 76/068* (2013.01); *H04W 28/18* (2013.01); *H04W 80/02* (2013.01)

(58) Field of Classification Search
CPC ... H04W 28/02; H04W 28/08; H04W 28/18; H04W 76/046; H04W 76/048; H04W 76/068; H04W 80/02

USPC ........................................................ 370/329
See application file for complete search history.

(56) References Cited

U.S. PATENT DOCUMENTS

| 2009/0016263 A1* | 1/2009 | Kishigami | ............... H04B 7/04 370/328 |
| 2009/0163199 A1 | 6/2009 | Kazmi et al. | |

(Continued)

FOREIGN PATENT DOCUMENTS

| CN | 101296459 A | 10/2008 |
| CN | 102231894 A | 11/2011 |

(Continued)

OTHER PUBLICATIONS

Assistance Information Framework; Nokia Siemens Networks, Nokia Corporation; 3GPP TSG-RAN WG2 Meeting #78; Prague, Czech Republic, May 21-25, 2012; R2-122108.

(Continued)

*Primary Examiner* — Chi H Pham
*Assistant Examiner* — Robert Lopata
(74) *Attorney, Agent, or Firm* — Ling Wu; Stephen Yang; Ling and Yang Intellectual Property

(57) ABSTRACT

A method, device and system for controlling assistant information of user equipment are disclosed. The field of wireless communication technology is related, and the problem is solved that the system efficiency is reduced, for UE reports the assistant information inappropriately. The method includes: the user equipment acquiring a control parameter of assistant information configured by a network side; and the user equipment reporting the assistant information of the user equipment to the network side according to the control parameter of assistant information. The technical scheme provided in the example of the present document is applied to a LTE system or a UMTS system, which implements that the network side controls the UE reporting the assistant information.

16 Claims, 4 Drawing Sheets

(51) Int. Cl.
*H04W 28/02* (2009.01)
*H04W 28/08* (2009.01)
*H04W 28/18* (2009.01)
*H04W 80/02* (2009.01)

(56) References Cited

U.S. PATENT DOCUMENTS

| | | | |
|---|---|---|---|
| 2013/0171994 A1* | 7/2013 | Huang | H04W 36/0072 455/438 |
| 2013/0250828 A1* | 9/2013 | Chou | H04W 72/0413 370/311 |
| 2013/0301500 A1* | 11/2013 | Koc | H04W 76/048 370/311 |
| 2014/0036750 A1* | 2/2014 | Yavuz | H04W 52/0216 370/311 |
| 2015/0017998 A1* | 1/2015 | Koskinen | H04W 24/10 455/450 |
| 2015/0105062 A1* | 4/2015 | Quan | H04W 8/24 455/418 |
| 2015/0156625 A1* | 6/2015 | Morioka | H04L 1/18 455/419 |
| 2015/0195753 A1* | 7/2015 | Jung | H04W 36/0055 370/331 |
| 2015/0257049 A1* | 9/2015 | Yavuz | H04W 8/20 455/436 |

FOREIGN PATENT DOCUMENTS

| | | |
|---|---|---|
| CN | 102421147 A | 4/2012 |
| JP | 2006509469 A | 3/2006 |
| JP | 2011508512 A | 3/2011 |
| WO | 2013140033 A1 | 9/2013 |

OTHER PUBLICATIONS

DRX configuration setting enhancements ;ZTE; 3GPP TSG-RAN WG2 Meeting #78; Prague, Czech Republic, May 21-25, 2012; R2-122252.

Discussion on UE Assistance Information; LG Electronics Inc. 3GPP TSG-RAN WG2 Meeting #78; Prague, Czech Republic, May 21-25, 2012; R2-122382.

Performance with power vs. performance optimized configurations; Nokia Siemens Networks, Nokia Corporation; 3GPP TSG-RAN WG2 Meeting #78; Prague, Czech Republic, May 21-25, 2012; R2-122515.

Further discussion on UE Assistance Information proposals; Huawei ; Hisilicon. 3GPP TSG-RAN WG2 Meeting #78; Prague, Czech Republic, May 21-25, 2012; R2-122677.

MTC Time Tolerant Feature; Samsung; 3GPP TSG SA WG2 Meeting #77; Feb. 22-26, 2010, San Francisco, USA. TD S2-101137.

\* cited by examiner

METHOD, DEVICE AND SYSTEM FOR CONTROLLING AUXILIARY INFORMATION ABOUT USER EQUIPMENT

TECHNICAL FIELD

The present document relates to the field of wireless communication technology, and particularly, to a method, device and system for controlling assistant information of user equipment.

BACKGROUND OF THE RELATED ART

With the gradual improvement of people's living standard, people's demands on communications also increase daily, wherein most of the demands are more personalized demands. Along with the raise and implementation of these demands, the terminal design also presents a new development tendency—an intelligent terminal with large screen.

The intelligent terminal can provide various services, from surfing the internet to optional installation and uninstallation of software, for the users, which makes application services of the terminal more complete and life of the users rich and colorful. However, with the widespread use of the intelligent terminal, disadvantages of the intelligent terminal itself and its influence on the current network side also become prominent day by day.

For the intelligent terminal itself, its power consumption is very high, and both standby time and service time are comparatively limited; and for the network, the large-scale applications of the intelligent terminal pose big signaling pressure and resource usage pressure on the network. A main factor causing the above phenomenon is: various application programs always running on the foreground and background of the operating system of the intelligent terminal, and these application programs untimely sending data to the network side or receiving data from the network side.

Generally, the system configures a Discontinuous Reception (DRX) cycle for the terminal, and the terminal receives and sends the data by a reminder at a pre-determined cycle, and then it enters a sleep cycle, thus a power-saving effect can be achieved; if the configured DRX cycle is too short, the terminal wakes frequently, and the power-saving effect cannot be achieved; and if the configured DRX is too long, an increase of the data delay may be caused. Only when the DRX cycle and the data reach a regular matching, can the data delay be guaranteed and the power-saving performance be achieved. Many applications run by the intelligent terminal such as the QQ chat are not so sensitive to the delay, thus a more power-saving configuration can be selected from the two objectives of power saving and service performance.

In addition, in order to be able to reduce the delay of data transmission and better guarantee the user experience, after the terminal completes transmission or reception of the data at a time, it can be kept in a Radio Resource Control (RRC) connection status for a long time, but wastage of electric quantity also increase in this way. However, if a time span of the terminal being kept in the connection status is quite short for saving the electric quantity, due to the transmission and reception of the data without timing, the terminal may be required to frequently initiate a random access process and a RRC connection establishment process; and if the time of the terminal being kept in the RRC connection status is quite long, excessive handover processes may be caused, thus the signaling pressure and the usage pressure of control resources of the network side will increase greatly.

Therefore, in order to be able to keep the standby time and service time of the intelligent terminal as long as possible and consider both the signaling pressure and resource usage pressure of the network, it is required to reasonably control the time span of the intelligent terminal being kept in the RRC connection status after finishing the operation of transmission or reception of the data at a time, that is, it is required to find out a balance point between the two.

According to the relevant simulation and analysis, it can be obtained that a movement speed of the intelligent terminal is an important determinant of the intelligent terminal being kept in the RRC connection status. In the condition of a lower movement speed, the intelligent terminal can be kept in the RRC connection status for a relatively longer time, thus the terminal can reduce the power loss by configuring reasonable parameters of discontinuous reception function, and meanwhile, it also can keep a lower overhead of signaling and resources (a probability of occurrence of handover is very low); in the condition of a higher movement speed, the intelligent terminal can be kept in the RRC connection status for a relatively shorter time, thus the terminal can save the power loss, and meanwhile, it also can reduce the overhead of signaling and resources (a handover operation is replaced with the reselection of cells). Therefore, it is necessary for the network side to master the relevant information of the movement information of the intelligent terminal, thereby reasonably controlling the time span of the terminal being kept in the RRC connection status.

An optimization with respect to the intelligent terminal is being discussed in the 3rd Generation Partnership Project (3GPP) at present, and the currently determined optimization measurement is that:

the terminal (i.e., User Equipment (UE)) can report assistant information, wherein the assistant information includes: whether the UE prefers a power-saving software user experience or a high-performance software user experience, mobility information of the UE and data transmission interval of the UE and so on, and the network side decides how to optimize wireless parameters of the UE according to the assistant information.

For example, if the UE wishes to be more power-saving in the assistant information, the network can configure a longer DRX cycle for the terminal so that the terminal is power-saving.

However, a rule of reporting the assistant information is not defined in the discussion of the 3GPP at present, in the condition of no control, the UE is likely to frequently send the assistant information, but not all the assistant information reported by the UE is necessary key information for the radio resource management of the network side (e.g., the preference of the UE to the power saving or the performance may not be always favorable to the network, if the preference of the UE is satisfied, load of the network side may increase), and gains will not be always brought to the radio resource efficiency of the system. Therefore, if the rule of the UE reporting the assistant information is inappropriate, excessively additional overhead will be brought to the system on the contrary, which reduces the system efficiency.

SUMMARY OF THE INVENTION

The example of the present document provides a method, device and system for controlling assistant information of user equipment, which solves the problem that the system efficiency is reduced, for the UE reports the assistant information inappropriately.

A method for controlling assistant information of user equipment comprises:

the user equipment acquiring a control parameter of assistant information configured by a network side; and the user equipment reporting the assistant information of the user equipment to the network side according to the control parameter of assistant information.

Preferably, the control parameter of assistant information includes a first preset time span; the user equipment reporting the assistant information of the user equipment to the network side according to the control parameter of assistant information comprises: the user equipment determining whether a time interval from the last transmission of assistant information exceeds the first preset time span when it is required to send the assistant information, when the time interval exceeds the first preset time span, the user equipment sending the assistant information, and when the time interval does not exceed the first preset time span, the user equipment not sending the assistant information.

Preferably, the user equipment contains a first timer, the user equipment reporting the assistant information of the user equipment to the network side according to the control parameter of assistant information comprises:

when the user equipment sends the assistant information, the first timer being cleared and restarting timing according to the first preset time span;

the user equipment checking a timing situation of the first timer when it is required to send the assistant information, if the first timer times out, the user equipment sending the assistant information, and if the first timer does not time out, the user equipment not sending the assistant information.

Preferably, the user equipment reporting the assistant information of the user equipment to the network side according to the control parameter of assistant information further comprises:

during the timing of the first timer, if the user equipment releases an RRC connection or the user equipment moves to other cells, the first timer stopping timing.

Preferably, the user equipment reporting the assistant information of the user equipment to the network side according to the control parameter of assistant information further comprises:

during the timing of the first timer, if the user equipment releases an RRC connection or the user equipment moves to other cells, the first timer continuing timing.

Preferably, the control parameter of assistant information includes a second preset threshold; the user equipment reporting the assistant information of the user equipment to the network side according to the control parameter of assistant information comprises: when the user equipment is in a RRC connection status and it is required to send the assistant information, the user equipment determining whether the number of times of the user equipment having sent the assistant information in the current RRC connection status reaches or exceeds the second preset threshold, when the second preset threshold is not reached, sending the assistant information, and when the second preset threshold is reached or exceeded, not sending the assistant information.

Preferably, the user equipment contains a second counter, the user equipment reporting the assistant information of the user equipment to the network side according to the control parameter of assistant information comprises:

when the user equipment triggers a RRC connection establishment process, the user equipment starting the second counter to start to count from zero;

the user equipment checking a counting situation of the second counter when it is required to send the assistant information, if a counting result of the second counter does not reach the second preset threshold, the user equipment sending the assistant information, and if the counting result of the second counter reaches or exceeds the second preset threshold, the user equipment not sending the assistant information.

Preferably, the user equipment reporting the assistant information of the user equipment to the network side according to the control parameter of assistant information further comprises:

when the user equipment establishing the RRC connection fails or the RRC connection of the user equipment is released, the second counter stopping counting.

Preferably, the user equipment reporting the assistant information of the user equipment to the network side according to the control parameter of assistant information further comprises:

when the user equipment initiates a handover process, the second counter stopping counting.

Preferably, the user equipment reporting the assistant information of the user equipment to the network side according to the control parameter of assistant information further comprises:

when the user equipment initiates a handover process, the second counter continuing counting.

Preferably, the control parameter of assistant information includes a third preset time span and a fourth preset threshold; the user equipment reporting the assistant information of the user equipment to the network side according to the control parameter of assistant information comprises: the user equipment determining whether the number of times of the user equipment sending the assistant information within the third preset time span reaches or exceeds the fourth preset threshold when it is required to send the assistant information, when the number of times of sending the assistant information does not reach the fourth preset threshold, sending the assistant information, and when the number of times of sending the assistant information reaches or exceeds the fourth preset threshold, not sending the assistant information.

Preferably, the user equipment contains a third timer and a fourth counter, the user equipment reporting the assistant information of the user equipment to the network side according to the control parameter of assistant information comprises:

when a triggering condition is satisfied, the third timer being cleared and retiming according to the third preset time span;

while the third timer is cleared and retimes, the fourth counter starting to count from zero;

the user equipment checking a counting situation of the fourth counter when it is required to send the assistant information, if a counting result of the fourth counter does not reach the fourth preset threshold, sending the assistant information, and if the counting result of the fourth counter reaches or exceeds the fourth preset threshold, not sending the assistant information.

Preferably, the triggering condition includes:

timing of the third timer expires according to the third preset time span.

Preferably, the triggering condition further includes:

the user equipment completing an Attach process to establish a connection with a core network; or, the user equipment completing an RRC connection process to establish a connection with an access network; or, the user equipment starting up; or, the user equipment receiving information including the control parameter of assistant information sent by the network side; or, reaching a time of starting the third timer to start timing customized by the user equipment.

Preferably, the user equipment reporting the assistant information of the user equipment to the network side according to the control parameter of assistant information further comprises:

when the user equipment initiates the handover process or reselects to be in other cells, the third timer stopping timing, and the fourth counter stopping counting.

Preferably, the user equipment reporting the assistant information of the user equipment to the network side according to the control parameter of assistant information further comprises:

when the user equipment initiates the handover process or reselects to be in other cells, the third timer continuing timing, and the fourth counter continuing counting.

Preferably, the user equipment acquiring a control parameter of assistant information configured by a network side is specifically:

the user equipment accepting the control parameter of assistant information configured by the network side for the user equipment through a system message; and/or, the user equipment accepting the control parameter of assistant information configured by the network side for the user equipment through a RRC dedicated signaling; and/or, the user equipment accepting the control parameter of assistant information configured by the network side for the user equipment through a Media Access Control (MAC) signaling; and/or, the user equipment accepting the control parameter of assistant information configured by the network side for the user equipment through a downlink control channel.

Preferably, when the user equipment accepts the control parameter of assistant information configured by the network side for the user equipment through the system message, the method further comprises:

when the user equipment performs handover or reselects to be in other cells, the user equipment reading a broadcast message of a target cell;

if the broadcast message of the target cell includes a control parameter of assistant information of the user equipment sending the assistant information, the user equipment sending the assistant information according to the control parameter of assistant information in the broadcast message; and if the broadcast message of the target cell does not include a control parameter of assistant information of the user equipment sending the assistant information, the user equipment not controlling the transmission of the assistant information.

Preferably, when the network side configures the control parameter of assistant information for the user equipment through the RRC dedicated signaling or the network side configures the control parameter of assistant information for the user equipment through the MAC signaling, the method further comprises:

after the user equipment performs handover or reselects to be in the target cell, the user equipment canceling a control parameter of assistant information of a source cell, and not performing control on the transmission of the assistant information; or, after the user equipment performs handover or reselects to be in the target cell, the user equipment canceling the control parameter of assistant information of the source cell, not performing control on the transmission of the assistant information, and after receiving the control parameter of assistant information sent by the target cell, performing control on the transmission of the assistant information according to the control parameter of assistant information sent by the target cell; or, after the user equipment performs handover or reselects to be in the target cell, continuing performing control on the transmission of the assistant information according to the control parameter of assistant information configured by the source cell; or, after the user equipment performs handover or reselects to be in the target cell, continuing performing control on the transmission of the assistant information according to the control parameter of assistant information configured by the source cell, and after receiving the control parameter of assistant information sent by the target cell, performing control on the transmission of the assistant information according to the control parameter of assistant information sent by the target cell.

The example of the present document further provides a method for controlling assistant information of user equipment, which comprises:

a network side determining whether it is required to perform control on the user equipment reporting the assistant information according to a load condition of the network side; and when determining that it is required to perform control on the user equipment reporting the assistant information, the network side configuring a control parameter of assistant information for the user equipment, and sending the control parameter of assistant information to the user equipment.

Preferably, the network side determining whether it is required to perform control on the user equipment reporting the assistant information according to a load condition of the network side comprises:

when a change of load is higher than a preset load threshold, the network side determining that it is required to perform control on the user equipment reporting the assistant information.

Preferably, when determining that it is required to perform control on the user equipment reporting the assistant information, the network side configuring a control parameter of assistant information for the user equipment comprises:

configuring the control parameter of assistant information for the user equipment at a preset moment of sending the control parameter of assistant information; or, after receiving the assistant information sent by the user equipment, the network side feeding back a rejection indication indicating that wireless parameters are not reconfigured for the user equipment to the user equipment, and configuring the control parameter of assistant information for the user equipment through the rejection indication; or, after receiving the assistant information sent by the user equipment, the network side feeding back configuration information including reconfigured wireless parameters to the user equipment, and configuring the control parameter of assistant information for the user equipment through the configuration information.

Preferably, a bearer way used when configuring the control parameter of assistant information for the user equipment is:

the network side configuring the control parameter of assistant information for the user equipment through a system message; and/or, the network side configuring the control parameter of assistant information for the user equipment through a RRC dedicated signaling; and/or, the network side configuring the control parameter of assistant information for the user equipment through a MAC signaling; and/or, the network side configuring the control parameter of assistant information for the user equipment through a downlink control channel.

Preferably, the control parameter of assistant information includes a first preset time span, the control parameter of assistant information is specifically: the user equipment determining whether a time interval from the last transmission of assistant information exceeds the first preset time span when it is required to send the assistant information, when the time interval exceeds the first preset time span, the user equipment sending the assistant information, and when the time interval does not exceed the first preset time span, the user equipment not sending the assistant information.

Preferably, the control parameter of assistant information includes a second preset threshold, the control parameter of assistant information is specifically: when the user equipment is in a RRC connection status and it is required to send the assistant information, the user equipment determining whether the number of times of the user equipment having sent the assistant information in the current RRC connection status reaches or exceeds the second preset threshold, when the number of times of having sent the assistant information does not reach the second preset threshold, sending the assistant information, and when the number of times of having sent the assistant information reaches or exceeds the second preset threshold, not sending the assistant information.

Preferably, the control parameter of assistant information includes a third preset time span and a fourth preset threshold, the control parameter of assistant information is specifically: the user equipment determining whether the number of times of the user equipment sending the assistant information within the third preset time span reaches or exceeds the fourth preset threshold when it is required to send the assistant information, when the number of times of sending the assistant information does not reach the fourth preset threshold, sending the assistant information, and when the number of times of sending the assistant information reaches or exceeds the fourth preset threshold, not sending the assistant information.

The example of the present document further provides a device for controlling assistant information of user equipment, which is applied to application settings and comprises:

a parameter acquisition module, configured to: acquire a control parameter of assistant information configured by a network side; and an assistant information report module, configured to: report the assistant information of the user equipment to the network side according to the control parameter of assistant information.

Preferably, the control parameter of assistant information includes a first preset time span; the assistant information report module is configured to report the assistant information of the user equipment to the network side according to the control parameter of assistant information, comprising: the user equipment determining whether a time interval from the last transmission of assistant information exceeds the first preset time span when it is required to send the assistant information, when the time interval exceeds the first preset time span, sending the assistant information, and when the time interval does not exceed the first preset time span, not sending the assistant information; the assistant information report module comprises:

a first timer, configured to: be cleared and restart timing according to the first preset time span when the user equipment sends the assistant information;

a first determination unit, configured to: check a timing situation of the first timer when it is required to send the assistant information, if the first timer times out, the user equipment sends the assistant information, and if the first timer does not time out, the user equipment does not send the assistant information.

Preferably, the first timer is further configured to: stop timing when the user equipment releases a RRC connection or the user equipment moves to other cells.

Preferably, the first timer is further configured to: continue timing when the user equipment releases a RRC connection or the user equipment moves to other cells.

Preferably, the control parameter of assistant information includes a second preset threshold; the assistant information report module being configured to report the assistant information of the user equipment to the network side according to the control parameter of assistant information comprises: when the user equipment is in a RRC connection status and it is required to send the assistant information, determining whether the number of times of the user equipment having sent the assistant information in the current RRC connection status reaches or exceeds the second preset threshold, when the second preset threshold is not reached, sending the assistant information, and when the second preset threshold is reached or exceeded, not sending the assistant information; the assistant information report module comprises:

a second counter, configured to: when the user equipment triggers a RRC connection establishment process, start to count from zero; and a second determination unit, configured to: check a counting situation of the second counter when it is required to send the assistant information, and if a counting result of the second counter does not reach the second preset threshold, the user equipment sends the assistant information, and if the counting result of the second counter reaches or exceeds the second preset threshold, the user equipment does not send the assistant information.

Preferably, the second counter is further configured to: stop counting when the user equipment establishing the RRC connection fails or the RRC connection of the user equipment is released.

Preferably, the second counter is further configured to: stop counting when the user equipment initiates a handover process.

Preferably, the second counter is further configured to: continue counting when the user equipment initiates a handover process.

Preferably, the control parameter of assistant information includes a third preset time span and a fourth preset threshold, the assistant information report module is configured to report the assistant information of the user equipment to the network side according to the control parameter of assistant information, comprising: determining whether the number of times of the user equipment sending the assistant information within the third preset time span reaches or exceeds the fourth preset threshold when it is required to send the assistant information, when the number of times of sending the assistant information does not reach the fourth preset threshold, sending the assistant information, and when the number of times of sending the assistant information reaches or exceeds the fourth preset threshold, not sending the assistant information; the assistant information report module comprises:

a third timer, configured to: be cleared when a triggering condition is satisfied, and retime according to the third preset time span, wherein the triggering condition includes timing of the third timer expires according to the third preset time span and/or any one or any multiple of the following events:

the user equipment completing an Attach process to establish a connection with a core network, the user equipment completing a RRC connection process to establish a connection with an access network, the user equipment starting up, the user equipment receiving information including the control parameter of assistant information sent by the network side, and reaching a time of starting the third timer to start timing customized by the user equipment;

a fourth counter, configured to: while the third timer is cleared and retimes, start to count from zero; and a third determination unit, configured to: check a counting situation of the fourth counter when it is required to send the assistant information, if a counting result of the fourth counter does not reach the fourth preset threshold, send the assistant information, and if the counting result of the fourth counter reaches or exceeds the fourth preset threshold, not send the assistant information.

Preferably, the third timer is further configured to: stop timing when the user equipment initiates a handover process or reselects to be in other cells; and the fourth counter is further configured to: stop counting when the third timer stops timing.

Preferably, the third timer is further configured to: continue timing when the user equipment initiates the handover process or reselects to be in other cells; and the fourth counter is further configured to: continue counting when the user equipment initiates the handover process or reselects to be in other cells.

Preferably, the parameter acquisition module is configured to acquire a control parameter of assistant information configured by a network side, comprising:

accepting the control parameter of assistant information configured by the network side for the user equipment through a system message; and/or, accepting the control parameter of assistant information configured by the network side for the user equipment through a RRC dedicated signaling; and/or, accepting the control parameter of assistant information configured by the network side for the user equipment through a MAC signaling; and/or, accepting the control parameter of assistant information configured by the network side for the user equipment through a downlink control channel.

The example of the present document further provides a device for controlling assistant information of user equipment, which is applied to a network side and comprises:

a control starting module, configured to: determine whether it is required to perform control on the user equipment reporting the assistant information according to a load condition of the network side;

a configuration execution module, configured to: when the control starting module determines that it is required to perform control on the user equipment reporting the assistant information, configure a control parameter of assistant information for the user equipment; and a transmitting module, configured to: send the control parameter of assistant information to the user equipment.

Preferably, the control starting module is configured to determine whether it is required to perform control on the user equipment reporting the assistant information according to a load condition of the network side, comprising:

when a change of load is higher than a preset load threshold, determining that it is required to perform control on the user equipment reporting the assistant information.

Preferably, the configuration execution module comprises:

a first configuration unit, configured to: configure the control parameter of assistant information for the user equipment at a preset moment of sending the control parameter of assistant information;

a second configuration unit, configured to: after receiving the assistant information sent by the user equipment, feed back a rejection indication indicating that wireless parameters are not reconfigured for the user equipment to the user equipment, and configure the control parameter of assistant information for the user equipment through the rejection indication; and a third configuration unit, configured to: after receiving the assistant information sent by the user equipment, feed back configuration information including reconfigured wireless parameters to the user equipment, and configure the control parameter of assistant information for the user equipment through the configuration information.

Preferably, a bearer way used when the configuration execution module configures the control parameter of assistant information for the user equipment is:

configuring the control parameter of assistant information for the user equipment through a system message; and/or, configuring the control parameter of assistant information for the user equipment through a RRC dedicated signaling; and/or, configuring the control parameter of assistant information for the user equipment through a MAC signaling; and/or, configuring the control parameter of assistant information for the user equipment through a downlink control channel.

Preferably, the control parameter of assistant information includes a first preset time span, and the assistant information report module is configured to report the assistant information of the user equipment to the network side according to the control parameter of assistant information. comprising: determining whether a time interval from the last transmission of assistant information exceeds the first preset time span when it is required to send the assistant information, when the time interval exceeds the first preset time span, sending the assistant information, and when the time interval does not exceed the first preset time span, not sending the assistant information; and/or, the control parameter of assistant information includes a second preset threshold, and the assistant information report module is configured to report the assistant information of the user equipment to the network side according to the control parameter of assistant information, comprising: when the user equipment is in a RRC connection status and it is required to send the assistant information, determining whether the number of times of the user equipment having sent the assistant information in a current RRC connection status reaches or exceeds the second preset threshold, when the second preset threshold is not reached, sending the assistant information, and when the second preset threshold is reached or exceeded, not sending the assistant information; and/or, the control parameter of assistant information includes a third preset time span and a fourth preset threshold, and the assistant information report module is configured to report the assistant information of the user equipment to the network side according to the control parameter of assistant information, comprising: determining whether the number of times of the user equipment sending the assistant information within the third preset time span reaches or exceeds the fourth preset threshold when it is required to send the assistant information, when the number of times of sending the assistant information does not reach the fourth preset threshold, sending the assistant information, and when the number of times of sending the assistant information reaches or exceeds the fourth preset threshold, not sending the assistant information.

The example of the present document further provides a system for controlling assistant information of user equipment, which comprises: an access network element at network side and a user equipment accessing a network via the access network element at network side;

the access network element at network side is configured to: determine whether it is required to perform control on the user equipment reporting the assistant information according to a load condition of the access network element at network side, and when determining that it is required to perform control on the user equipment reporting the assistant information, configure a control parameter of assistant information for the user equipment; and the user equipment is configured to: acquire the control parameter of assistant information configured by the access network element at network side, and report the assistant information of the user equipment to the access network element at network side according to the control parameter of assistant information.

Preferably, the access network element at network side comprises the device for controlling the assistant information of the user equipment applied to the network side; and the user equipment comprises the device for controlling the assistant information of the user equipment applied to the user equipment.

The example of the present document provides a method, device and system for controlling the assistant information of the user equipment, and the network side and the user equipment appoint a control parameter of assistant information of the user equipment reporting the assistant information of the user equipment, and the user equipment reports the assistant information of the user equipment to the network side according to the control parameter of assistant information, which implements that the user equipment reports the assistant information according to an appointment between the user equipment and the network side, avoiding that the UE sends the assistant information frequently, and solves the problem that the system efficiency is reduced, for the UE reports the assistant information inappropriately.

PREFERRED EMBODIMENTS OF THE PRESENT DOCUMENT

A rule of reporting the assistant information of UE is not defined in the discussion of the 3GPP at present, and in the condition of no control, the UE is likely to frequently send the assistant information, but not all the assistant information reported by the UE is necessary key information for the radio resource management of the network side (e.g., the preference of the UE to the power saving or the performance may not be always favorable to the network, and if the preference of the UE is satisfied, load of the network side may increase), and gains will not be always brought to the radio resource efficiency of the system. Therefore, if the rule of the UE reporting the assistant information is inappropriate, excessively additional overhead will be brought to the system on the contrary, which reduces the system efficiency.

In order to solve the above problem, the example of the present document provides a method, device and system for controlling assistant information of user equipment. The examples of the present document will be described in detail in combination with the accompanying drawings below. It should be noted that the examples in the present document and the characteristics in the examples can be optionally combined with each other in the condition of no conflict.

The example 1 of the present document will be firstly described in combination with the accompanying drawing.

Figure 1:
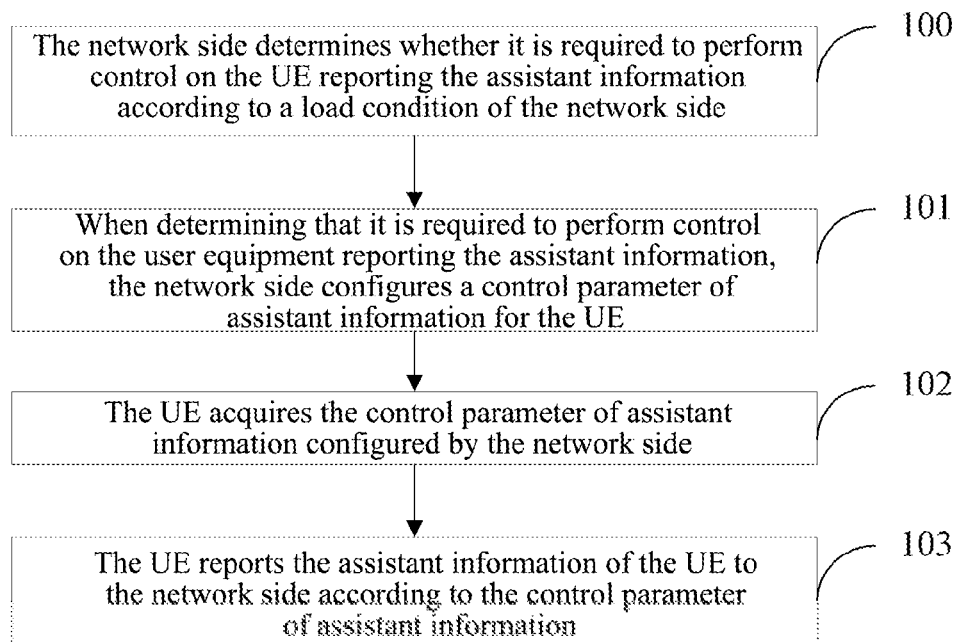
FIG. 1 is a flow diagram of a method for controlling assistant information of user equipment provided in the example 1 of the present document.

The example of the present document provides a method for controlling assistant information of the user equipment, descriptions are made with an example of an evolved Node B (eNB) completing functions of the network side and the user equipment being specifically the UE, and the flow of controlling the UE to send the assistant information with the method is as shown in FIG. 1, and the following steps are included.

In step 100, the network side determines whether it is required to perform control on the UE reporting the assistant information according to a load condition of the network side.

The network side can determine whether it is required to perform control on the UE sending the assistant information according to the load condition of the network side, and if the network side considers that control is not required, the network side does not need to send an control parameter of assistant information to the UE; and if the network side considers that the load is serious and it is required to perform control on the UE, the network side can send the control parameter of assistant information and initiate a flow of appointing the control parameter of assistant information with the UE.

In step 101, when determining that it is required to perform control on the user equipment reporting the assistant information, the network side configures the control parameter of assistant information for the UE.

The step specifically includes the following three implementation ways:

1. The network side initiates to appoint the control parameter of assistant information with the UE according to a preset moment of sending the control parameter of assistant information.

2. The network side initiates to appoint the control parameter of assistant information with the UE when a change of load is higher than a preset load threshold.

Regarding when the network side to configure the control parameter of assistant information, one of the factors depends on the condition of changes of load at the network side, and when the load is higher than a certain limit (the limits are different according to the difference of performance between products of different manufacturers), the network side can decide to control the transmission of the assistant information of the UE and configure the control parameter of assistant information.

3. After receiving the assistant information sent by the UE, the network side feeds back a rejection indication indicating that wireless parameters are not reconfigured for the UE to the UE or feeds back configuration information including the reconfigured wireless parameters to the UE, the control parameter of assistant information included in the rejection indication or the configuration information, so as to initiate to appoint the control parameter of assistant information with the UE.

After the network side receives the assistant information of the UE, if it is unwilling to reconfigure the wireless parameters for the UE according to the assistant information of the UE due to the load, the network side can feed back the rejection indication, and meanwhile, it can send the control parameter of assistant information and the rejection indication to the UE together, thus signaling overhead can be saved.

Or, after the network side receives the assistant information of the UE, if the network side determines to reconfigure the wireless parameters for the UE according to the assistant information of the UE, the network side sends the control parameter of assistant information and the reconfigured wireless parameters to the UE together through the configuration information, and the signaling overhead also can be saved.

In step 102, the UE acquires the control parameter of assistant information configured by the network side.

The specific contents of the control parameter of assistant information can be set according to the network situations and application requirements, and examples of the specific contents of several kinds of control parameter of assistant information are given below.

1. The control parameter of assistant information includes a first preset time span, the user equipment reporting the assistant information of the user equipment to the network side according to the control parameter of assistant information includes: the user equipment determining whether a time interval from the last transmission of the assistant information exceeds the first preset time span when it is required to send the assistant information, when the time interval exceeds the first preset time span, the UE sending the assistant information, and when the time interval does not exceed the first preset time span, the UE not sending the assistant information.

2. The control parameter of assistant information includes a second preset threshold, the user equipment reporting the assistant information of the user equipment to the network side according to the control parameter of assistant information includes: when the UE is in a RRC connection status and it is required to send the assistant information, the UE determining whether the number of times of the user equipment having sent the assistant information in the current RRC connection status reaches or exceeds the second preset threshold, when the number of times of having sent the assistant information does not reach the second preset threshold, sending the assistant information, and when the number of times of having sent the assistant information reaches or exceeds the second preset threshold, not sending the assistant information.

3. The control parameter of assistant information includes a third preset time span and a fourth preset threshold, the user equipment reporting the assistant information of the user equipment to the network side according to the control parameter of assistant information includes: the user equipment determining whether the number of times of the UE sending the assistant information within the third preset time span reaches or exceeds the fourth preset threshold when it is required to send the assistant information, when the number of times of sending the assistant information does not reach the fourth preset threshold, sending the assistant information, and when the number of times of sending the assistant information reaches or exceeds the fourth preset threshold, not sending the assistant information.

In the step, the control parameter of assistant information can be sent by the network side to the UE through messages or signaling, and it also can be appointed by the network side and the UE in advance, and a specific implementation way is described as follows.

1. The network side configures the control parameter of assistant information for the UE through system messages.

The system message is specifically a system broadcast message, for example, a new IE can be added in a SystemInformationBlock2 (SIB2) to bear the control parameter of assistant information of UE.

The following is an embodiment:

```
SystemInformationBlockType2 ::=      SEQUENCE {
    ac-BarringInfo                   SEQUENCE {
        ac-BarringForEmergency           BOOLEAN,
        ac-BarringForMO-Signalling       AC-BarringConfig
    OPTIONAL,-- Need OP
        ac-BarringForMO-Data             AC-BarringConfig
    OPTIONAL -- Need OP
    }
    OPTIONAL,-- Need OP
    radioResourceConfigCommon            RadioResourceConfigCommonSIB,
    ue-TimersAndConstants                UE-TimersAndConstants,
    freqInfo                             SEQUENCE {
        ul-CarrierFreq                       ARFCN-ValueEUTRA
    OPTIONAL,-- Need OP
        ul-Bandwidth                         ENUMERATED {n6, n15, n25,
```

```
n50, n75, n100}
    OPTIONAL,-- Need OP
        additionalSpectrumEmission        AdditionalSpectrumEmission
    },
    mbsfn-SubframeConfigList              MBSFN-SubframeConfigList
OPTIONAL,   -- Need OR
    timeAlignmentTimerCommon              TimeAlignmentTimer,
    ...,
    lateNonCriticalExtension      OCTET STRING
OPTIONAL,-- Need OP
    [[  ssac-BarringForMMTEL-Voice-r9     AC-BarringConfig
OPTIONAL,-- Need OP
        ssac-BarringForMMTEL-Video-r9     AC-BarringConfig
OPTIONAL -- Need OP
    ]],
    [[  ac-BarringForCSFB-r10             AC-BarringConfig
OPTIONAL -- Need OP
    ]]
    ue-AssistantInfoControl                       UE-AssistantInfoControl-IE
OPTIONAL -- Need OP
}
UE-AssistantInfoControl-IE ::=    SEQUENCE {
    Threshold-1                   ENUMERATED {
                                      s00, s10, s20, s40,
                                      s60, s80, s100,s200,s400,s800},
}
```

The above is an example of adding the first preset threshold in a pseudocode of the SIB2 of the existing Long Term Evolution (LTE) protocol, that is, an IE ue-AssistantInfoControl is newly added in the SIB2 to be used for bearing the first preset threshold. The above s00, s10 and s20 respectively represent 0 second, 10 seconds and 20 seconds, and so forth.

The same method also can be applied to the setting of the second preset threshold, or the setting of the third preset time span, or the setting of the fourth preset threshold.

Besides adding the IE in the existing SIB, a new SIB also can be defined, for example, the SIB15 bears the control parameter of assistant information of UE.

2. The network side configures the control parameter of assistant information for the UE through a RRC dedicated signaling.

For example, the control parameter of assistant information of UE is borne by newly adding the IE in the existing RRC signaling, or the control parameter of assistant information of UE is borne by defining a new RRC signaling.

An example is given by newly adding the IE in the existing RRC signaling below.

The control parameter of assistant information of UE can be borne by adding the IE in RRCConnectionSetup, SecurityModeCommand, RCConnectionReconfiguration, RRCConnectionReestablishment, RRCConnectionReestablishmentReject, RRCConnectionReject, RRCConnectionRelease, UECapabilityEnquiry and UEInformationRequest, and a design way of the IE also can refer to the above example of the pseudocode of the SIB2.

3. The network side configures the control parameter of assistant information for the UE through a MAC signaling.

Figure 2:
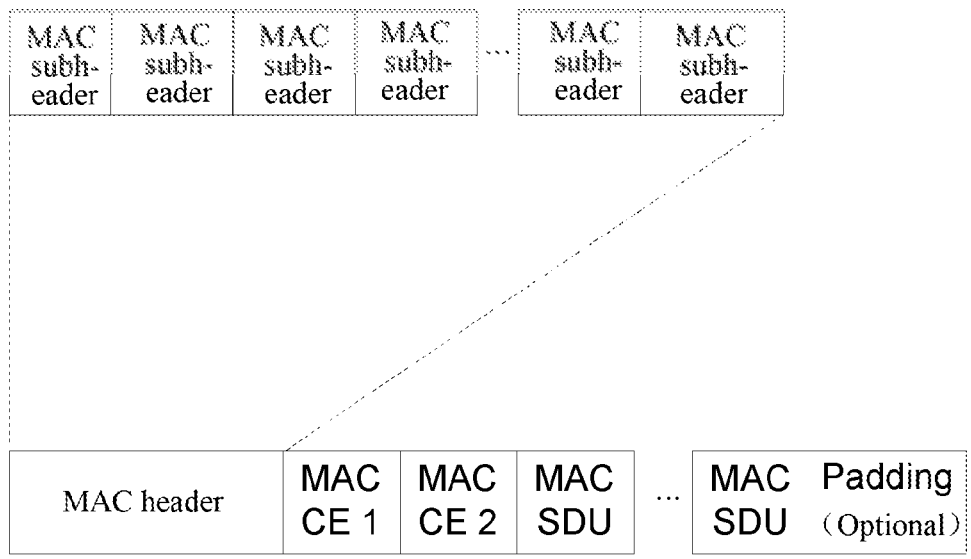
FIG. 2 is a schematic diagram of structure of a MAC PDU in the example 1 of the present document.

A MAC Protocol Data Unit (PDU) defined in the protocol standard of LTE MAC layer is as shown in FIG. 2.

The MAC PDU is composed of a MAC header, an MAC Control Element (CE) and a MAC Service Data Unit (SDU), wherein the MAC SDU is used for bearing data or signaling, one MAC PDU can contain 0 or multiple MAC SDUs (that is, when a null data packet is transmitted, the MAC PDU can have no MAC SDU and only contain the MAC header and the MAC CE); the MAC CE is used for transferring certain control information related to the radio resource management (for example, in the related art, there exists a MAC CE used for indicating the data volume in UE cache and a MAC CE used for indicating the UE power margin and so on); and the MAC header is composed of multiple MAC subheaders, and each MAC subheader is in one-to-one correspondence with the MAC CE and the MAC SDU, and it is used for indicating information including names of the corresponding MAC CE and the MAC SDU (a Logic Channel Identifier (LCID) field in the MAC subheader is used for representing the names of the corresponding MAC CE and the MAC SDU) and lengths of the corresponding MAC CE and the MAC SDU (an L field in the MAC subheader is used for representing the lengths of the corresponding MAC CE and the MAC SDU) and so on.

Figure 3:
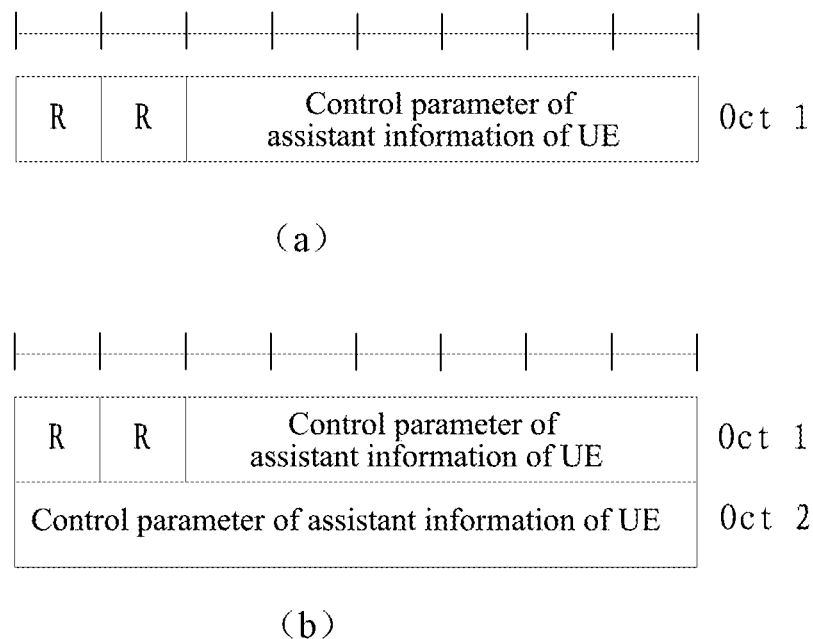
FIG. 3 is a schematic diagram of structure of a MAC CE provided in the example 1 of the present document.

A new MAC CE is defined to bear the control parameter of assistant information of UE, and a structure of the MAC CE is as shown in FIG. 3.

"R" in the figure represents a reserved bit; if the control parameter of assistant information of the UE is less than one byte, a defining method in FIG. 3 (a) can be adopted; and if the control parameter of assistant information of the UE is greater than one byte and less than two bytes, a defining method in FIG. 3 (b) can be adopted; and the above is only an example, if the control parameter of assistant information of the UE is greater than two bytes, a number of defined bytes can be added in a similar defining way.

The method for defining the LCID corresponding to the MAC CE with the control parameter of assistant information is described as follows.

The definitions of downlink LCIDs defined in the existing LTE MAC layer protocol is shown in the following Table 1.

TABLE 1

Downlink shared channel LCID table

| Serial number | LCID Values |
|---|---|
| 00000 | Common control channel |
| 00001-01010 | Logic channel IDs |
| 01011-11010 | Reserved serial numbers |

TABLE 1-continued

Downlink shared channel LCID table

| Serial number | LCID Values |
| --- | --- |
| 11011 | Activation/deactivation indication |
| 11100 | UE contention resolution identifier |
| 11101 | Time advance command |
| 11110 | DRX (Discontinuous Reception) command |
| 11111 | Padding information |

The method for newly defining the LCID corresponding to the MAC CE with the control parameter of assistant information therein is shown in the following Table 2.

TABLE 2

Downlink shared channel LCID table

| Serial number | LCID Values |
| --- | --- |
| 00000 | Common control channel |
| 00001-01010 | Logic channel IDs |
| 01011-11001 | Reserved serial numbers |
| 11010 | Control parameter of assistant information of UE |
| 11011 | Activation/deactivation indication |
| 11100 | UE contention resolution identifier |
| 11101 | Time advance command |
| 11110 | DRX (Discontinuous Reception) command |
| 11111 | Padding information |

A serial number is lined out from the reserved serial numbers and used for defining the control parameter of assistant information of UE. After reading the LCID, a receiving terminal can know that the corresponding MAC PDU includes the MAC CE with the control parameter of assistant information of UE, and then it can read the control parameter of assistant information of UE in the MAC CE.

4. The network side configures the control parameter of assistant information for the UE through a downlink control channel.

In the LTE system, the eNB can transmit the control parameter of assistant information of UE to the UE through a Physical Downlink Control Channel (PDCCH).

The embodiment includes:

selecting one format from the existing PDCCH formats, and adding a field in the format to bear the control parameter of assistant information of UE;

newly defining a PDCCH format to be used for transmitting the control parameter of assistant information of UE;

for example, the PDCCH in the existing LTE system has a variety of formats which are respectively used for indicating downlink resource assignment or uplink resource scheduling of the UE, and an example of adding the control parameter of assistant information of UE in a PDCCH format 1(a format 1) is given below.

The PDCCH format 1 added with the control parameter of assistant information of UE is shown in the following Table 3.

TABLE 3

PDCCH format added with the control parameter of assistant information of UE

Field
Carrier indicator
Resource allocation header
Resource block assignment

TABLE 3-continued

PDCCH format added with the control parameter of assistant information of UE

Modulation and coding scheme ( modulation-demodulation order )
HARQ process number ( Hybrid Automatic Repeat Request process number )
New data indicator
Redundancy version
TPC command for PUCCH ( transmit power control )
Downlink Assignment Index
Control parameter of assistant information of UE Wherein, the control parameter of assistant information of UE is added at the end of the PDCCH format 1 of the existing LTE standard, and the field length of the control parameter of assistant information of UE is determined according to a defined granularity of the control parameter of assistant information of UE.

Similarly, the control parameter of assistant information of UE also can be added in other PDCCH formats of the existing LTE standard, and the method is similar to that in the above example.

A PDCCH format also can be newly defined, for example, the PDCCH format 5 is defined to be dedicatedly used for bearing the control parameter of assistant information of UE.

5. The network side sends the rejection indication indicating that wireless parameters are refused to be reconfigured for the UE and the control parameter of assistant information to the UE together; or, 6. The network side sends the wireless parameters reconfigured for the UE and the control parameter of assistant information to the UE together; or, 7. The network side and the UE appoint the control parameter of assistant information in advance.

After the UE and the network side appoint the control parameter of assistant information, the assistant information can be sent according to the control parameter of assistant information, and it enters step 102.

In step 103, the UE reports the assistant information of the UE to the network side according to the control parameter of assistant information.

In the step, corresponding to the control parameter of assistant information of the step 102, the UE performs the reporting of the assistant information according to contents of configuration parameters of assistant information, and a specific implementation is described as follows.

1. (Corresponding to the contents of the first kind of control parameter of assistant information in the step 102) the UE includes a first timer, when the UE sends the assistant information, the first timer is cleared, and then the first timer restarts timing according to the first preset time span, and a timing unit can be a millisecond, a subframe and a second and so on. The UE checks a timing situation of the first timer when it is required to send the assistant information, if the first timer times out, the UE sends the assistant information, and if the first timer does not time out, the UE does not send the assistant information.

This way is to perform long-time statistics on the frequency of sending the assistant information of the UE, it is applicable to the scenario of the UE frequently establishing and releasing the RRC connection, for example, when the UE runs the software of instant message type (such as QQ and MSN and so on), the data transmission interval of the UE is normally more than ten seconds or dozens of seconds, at this point, when the UE has no data to be sent, the RRC connection is likely to be released by the network side, and when the UE has data arriving, it is required to reestablish the RRC connection again. With regard to such scenario, making the first timer of the UE keep timing can control the frequency of sending the assistant information more accurately.

Moreover, during the timing of the first timer, if the UE releases the RRC connection or the UE moves to other cells, the first timer can stop timing.

2. (Corresponding to the contents of the second kind of control parameter of assistant information in the step 102) the UE includes a second counter, and when the UE triggers a RRC connection establishment process, the UE starts the second counter to start to count from zero, and the UE checks a counting situation of the second counter when it is required to send the assistant information, if a counting result of the second counter does not reach the second preset threshold, the UE sends the assistant information, and if the counting result of the second counter reaches or exceeds the second preset threshold, the UE does not send the assistant information.

When the UE establishing the RRC connection fails or the RRC connection of the UE is released, the second counter can continue counting, and it also can stop counting.

3. (Corresponding to the contents of the third kind of control parameter of assistant information in the step 102) the UE includes a third timer and a fourth counter, and when a triggering condition is satisfied, the third timer is cleared and retimes according to the third preset time span, and the fourth counter starts to count from zero while the third timer is cleared and retimes, and the UE checks a counting situation of the fourth counter when it is required to send the assistant information, if a counting result of the fourth counter does not reach the fourth preset threshold, it sends the assistant information, and if the counting result of the fourth counter reaches or exceeds the fourth preset threshold, it does not send the assistant information.

When the UE initiates the handover process or reselects to be in other cells, the third timer stops timing, and the fourth counter stops counting; alternatively, the third timer also can continue timing, and the fourth counter also can continue counting.

In the example of the present document, the triggering condition is preferably that timing of the third timer expires according to the third preset time span. Moreover, the following any one or any multiple of events can be taken as the triggering condition to individually trigger the third timer to time, any one or any multiple of events in the following events and the event of "timing of the third timer expires according to the third preset time span" also can be combined to serve as the triggering condition, and the events that can be taken as the triggering condition are as follows:

the UE completing an Attach process to establish a connection with a core network; or, the UE completing a RRC connection process to establish a connection with an access network; or, the UE starting up; or, the UE receiving information including the control parameter of assistant information sent by the network side; or, reaching a starting time customized by the UE.

So far, the general flow of the UE sending the control information of assistant information according to the control parameter of assistant information ends.

Since the user of the UE is in continuous movement, when the UE performs handover or reselects to be in other cells, the control of transmission of corresponding assistant information is also required. Specifically, if the control parameter of assistant information of UE is configured by the network side for the UE through the system message, the UE reads the broadcast message of a new cell (or called a target cell), and if the broadcast message of the new cell includes the control parameter of assistant information of UE, the UE controls the transmission of the assistant information according to the control parameter of assistant information of UE, and if the broadcast message of the new cell does not include the control parameter of assistant information of UE, the UE does not control the transmission of the assistant information; when the UE performs handover or reselects to be in other cells, if the control parameter of assistant information of UE is configured by the network side for the UE through the RRC dedicated signaling or is configured by the network side for the UE through the MAC signaling, the UE cancels the control parameter of assistant information configured by a source cell for the UE, and the UE does not perform control on the transmission of the assistant information in the new cell, until the UE receives the control parameter of assistant information configured by the new cell, or the UE continues performing control on the transmission of the assistant information according to the control parameter of assistant information configured by the source cell for the UE, and after the UE receives the control parameter of assistant information configured by the new cell, the UE performs control on the transmission of the assistant information according to the control parameter of assistant information configured by the new cell.

According to the way of the network side configuring the control parameter of assistant information for the UE in the step 102, when the UE moves to be in other cells (including performing handover or reselecting to be in other cells), the configuration way according to the control parameter of assistant information of UE comprises 3 situations.

Situation 1. If the control parameter of assistant information of UE is configured for the UE through the broadcast message, the UE stops controlling the transmission of the assistant information according to the control parameter of assistant information of UE in the broadcast message of the source cell. Preferably, after stopping controlling the transmission of the assistant information according to the control parameter of assistant information of the source cell, the UE reads the broadcast message of the new cell (or called the target cell), and if the broadcast message of the new cell includes the control parameter of assistant information of UE, the UE controls the transmission of the assistant information according to the control parameter of assistant information of UE, and if the broadcast message of the new cell does not include the control parameter of assistant information of UE, the UE does not control the transmission of the assistant information.

Situation 2. If the control parameter of assistant information of UE is configured for the UE through the RRC signaling or the MAC signaling, there exist two resolution ways, one of the ways can be selected.

Way 1. The UE cancels the control parameter of assistant information configured by the source cell for the UE, and the UE does not perform control on the transmission of the assistant information in the new cell; preferably, if the UE receives the control parameter of assistant information configured by the new cell soon afterwards, the UE performs control on the transmission of the assistant information according to the control parameter of assistant information configured by the new cell.

Way 2. The UE continues performing control on the transmission of the assistant information according to the control parameter of assistant information configured by the source cell for the UE; preferably, when the UE receives the control parameter of assistant information configured by the new cell soon afterwards, the UE performs control on the transmission of the assistant information according to the control parameter of assistant information configured by the new cell.

Situation 3. If a fixed control parameter of assistant information of UE is configured through the protocol standard, the UE continues to keep performing control on the transmission of the assistant information according to the fixed control parameter of assistant information of UE.

The example 2 of the present document will be described in combination with the accompanying drawing below.

Figure 4:
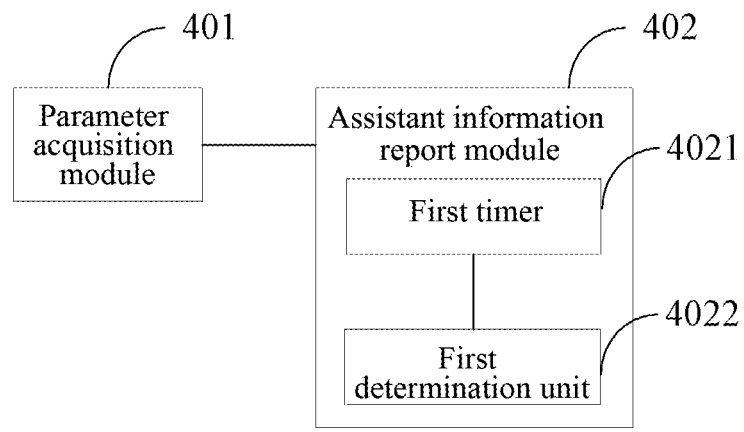
FIG. 4 is a schematic diagram of structure of a device for controlling assistant information of user equipment provided in the example 2 of the present document.

The example of the present document provides a device for controlling assistant information of the user equipment, and a structure of the device is as shown in FIG. 4, which includes:

a parameter acquisition module 401, configured to: acquire a control parameter of assistant information configured by a network side; and an assistant information report module 402, configured to: report the assistant information of the user equipment to the network side according to the control parameter of assistant information.

Preferably, the control parameter of assistant information includes a first preset time span, the assistant information report module being configured to report the assistant information of the user equipment to the network side according to the control parameter of assistant information includes: the user equipment determining whether a time interval from the last transmission of assistant information exceeds the first preset time span when it is required to send the assistant information, when the time interval exceeds the first preset time span, the user equipment sending the assistant information, and when the time interval does not exceed the first preset time span, the user equipment not sending the assistant information; the assistant information report module 402 includes:

a first timer 4021, configured to: be cleared and restart timing according to the first preset time span when the user equipment sends the assistant information; and a first determination unit 4022, configured to: check a timing situation of the first timer 4021 when it is required to send the assistant information, if the first timer 4021 times out, the user equipment sends the assistant information, and if the first timer 4021 does not time out, the user equipment does not send the assistant information.

Preferably, the first timer 4021 is further configured to: stop timing when the user equipment releases a RRC connection or the user equipment moves to other cells.

Preferably, the first timer 4021 is further configured to: continue timing when the user equipment releases a RRC connection or the user equipment moves to other cells.

The device for controlling the configuration information of the user equipment in the example of the present document can be integrated in the user equipment, and the user equipment completes the corresponding functions. Preferably, the user equipment related in the example of the present document is the UE.

The example 3 of the present document will be described in combination with the accompanying drawing below.

Figure 5:
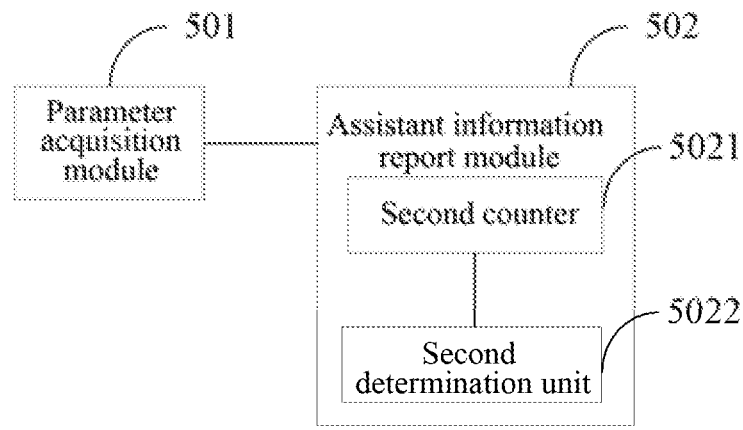
FIG. 5 is a schematic diagram of structure of a device for controlling assistant information of user equipment provided in the example 3 of the present document.

The example of the present document also provides a device for controlling assistant information of the user equipment, and a structure of the device is as shown in FIG. 5, which includes:

a parameter acquisition module 501, configured to: acquire a control parameter of assistant information configured by a network side; and an assistant information report module 502, configured to: report the assistant information of the user equipment to the network side according to the control parameter of assistant information.

Preferably, the control parameter of assistant information includes a second preset threshold, the assistant information report module being configured to report the assistant information of the user equipment to the network side according to the control parameter of assistant information includes: when the user equipment is in a RRC connection status and it is required to send the assistant information, determining whether the number of times of the user equipment having sent the assistant information in the current RRC connection status reaches or exceeds the second preset threshold, when the second preset threshold is not reached, sending the assistant information, and when the second preset threshold is reached or exceeded, not sending the assistant information; the assistant information report module 502 includes:

a second counter 5021, configured to: when the user equipment triggers a RRC connection establishment process, start to count from zero; and a second determination unit 5022, configured to: check a counting situation of the second counter 5021 when it is required to send the assistant information, if a counting result of the second counter 5021 does not reach the second preset threshold, the user equipment sends the assistant information, and if the counting result of the second counter 5021 reaches or exceeds the second preset threshold, the user equipment does not send the assistant information.

Preferably, the second counter 5021 is further configured to: stop counting when the user equipment establishing the RRC connection fails or the RRC connection of the user equipment is released.

Preferably, the second counter 5021 is further configured to: stop counting when the user equipment initiates a handover process.

Preferably, the second counter 5021 is further configured to: continue counting when the user equipment initiates a handover process.

The device for controlling the configuration information of the user equipment in the example of the present document can be integrated in the user equipment, and the user equipment completes the corresponding functions. Preferably, the user equipment related in the example of the present document is the UE.

The example 4 of the present document will be described in combination with the accompanying drawing below.

Figure 6:
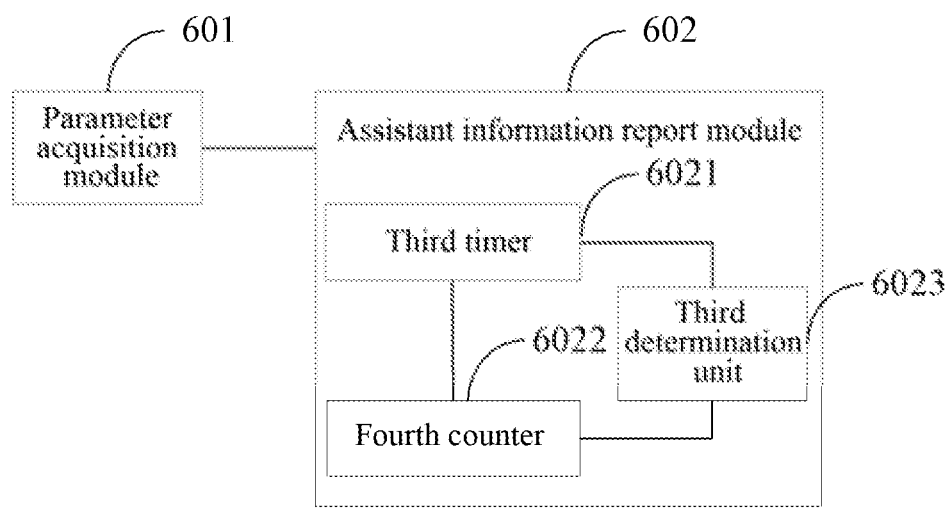
FIG. 6 is a schematic diagram of structure of a device for controlling assistant information of user equipment provided in the example 4 of the present document.

The example of the present document also provides a device for controlling assistant information of the user equipment, and a structure of the device is as shown in FIG. 6, which includes:

a parameter acquisition module 601, configured to: acquire a control parameter of assistant information configured by a network side; and an assistant information report module 602, configured to: report the assistant information of the user equipment to the network side according to the control parameter of assistant information.

Preferably, the control parameter of assistant information includes a third preset time span and a fourth preset threshold, the assistant information report module being configured to report the assistant information of the user equipment to the network side according to the control parameter of assistant information includes: the user equipment determining whether the number of times of the user equipment sending the assistant information within the third preset time span reaches or exceeds the fourth preset threshold when it is required to send the assistant information, when the number of times of sending the assistant information does not reach the fourth preset threshold, sending the assistant information, and when the number of times of sending the assistant information reaches or exceeds the fourth preset threshold, not sending the assistant information; the assistant information report module 602 includes:

a third timer 6021, configured to: be cleared when a triggering condition is satisfied, and retime according to the third preset time span, wherein the triggering condition includes the timing of the third timer 6021 expires according to the third preset time span and/or any one or any multiple of the following events:

the user equipment completing an Attach process to establish a connection with a core network, the user equipment completing a RRC connection process to establish a connection with an access network, the user equipment starting up, the user equipment receiving information including the control parameter of assistant information sent by the network side, and reaching a time of starting the third timer to start timing customized by the user equipment;

a fourth counter 6022, configured to: while the third timer 6021 is cleared and retimes, start to count from zero;

a third determination unit 6023, configured to: check a counting situation of the fourth counter 6022 when it is required to send the assistant information, if a counting result of the fourth counter 6022 does not reach the fourth preset threshold, send the assistant information, and if the counting result of the fourth counter 6022 reaches or exceeds the fourth preset threshold, not send the assistant information.

Preferably, the third timer 6021 is further configured to: stop timing when the user equipment initiates a handover process or reselects to be in other cells; and the fourth counter 6022 is further configured to: stop counting when the third timer 6021 stops timing.

Preferably, the third timer 6021 is further configured to: continue timing when the user equipment initiates the handover process or reselects to be in other cells; and the fourth counter 6022 is further configured to: continue counting when the user equipment initiates the handover process or reselects to be in other cells.

The device for controlling the configuration information of the user equipment in the example of the present document can be integrated in the user equipment, and the user equipment completes the corresponding functions. Preferably, the user equipment related in the example of the present document is the UE.

The example 5 of the present document will be described in combination with the accompanying drawing below.

Figure 7:
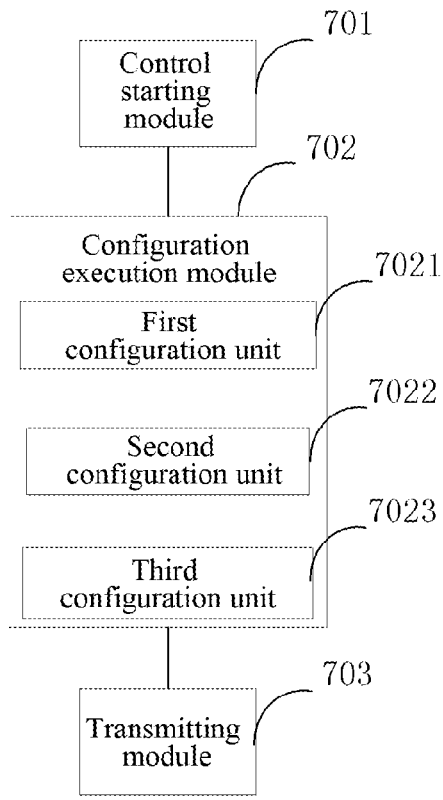
FIG. 7 is a schematic diagram of structure of a device for controlling assistant information of user equipment provided in the example 5 of the present document.

The example of the present document provides a device for controlling assistant information of the user equipment, applied to the network side, and a structure of the device is as shown in FIG. 7, which includes:

a control starting module 701, configured to: determine whether it is required to perform control on the user equipment reporting the assistant information according to a load condition of the network side;

a configuration execution module 702, configured to: when the control starting module determines that it is required to perform control on the user equipment reporting the assistant information, configure a control parameter of assistant information for the user equipment; and a transmitting module 703, configured to: send the control parameter of assistant information to the user equipment.

Preferably, the configuration execution module 702 includes:

a first configuration unit 7021, configured to: configure the control parameter of assistant information for the user equipment at a preset moment of sending the control parameter of assistant information;

a second configuration unit 7022, configured to: after receiving the assistant information sent by the user equipment, feed back a rejection indication indicating that wireless parameters are not reconfigured for the user equipment to the user equipment, and configure the control parameter of assistant information for the user equipment through the rejection indication; and a third configuration unit 7023, configured to: after receiving the assistant information sent by the user equipment, feed back configuration information including the reconfigured wireless parameters to the user equipment.

The device for controlling the assistant information of the user equipment provided in the example of the present document can be integrated in an access network element at network side, and the access network element at network side completes the corresponding functions. Preferably, the access network element at network side is an eNB.

The example 6 of the present document will be described in combination with the accompanying drawing below.

Figure 8:
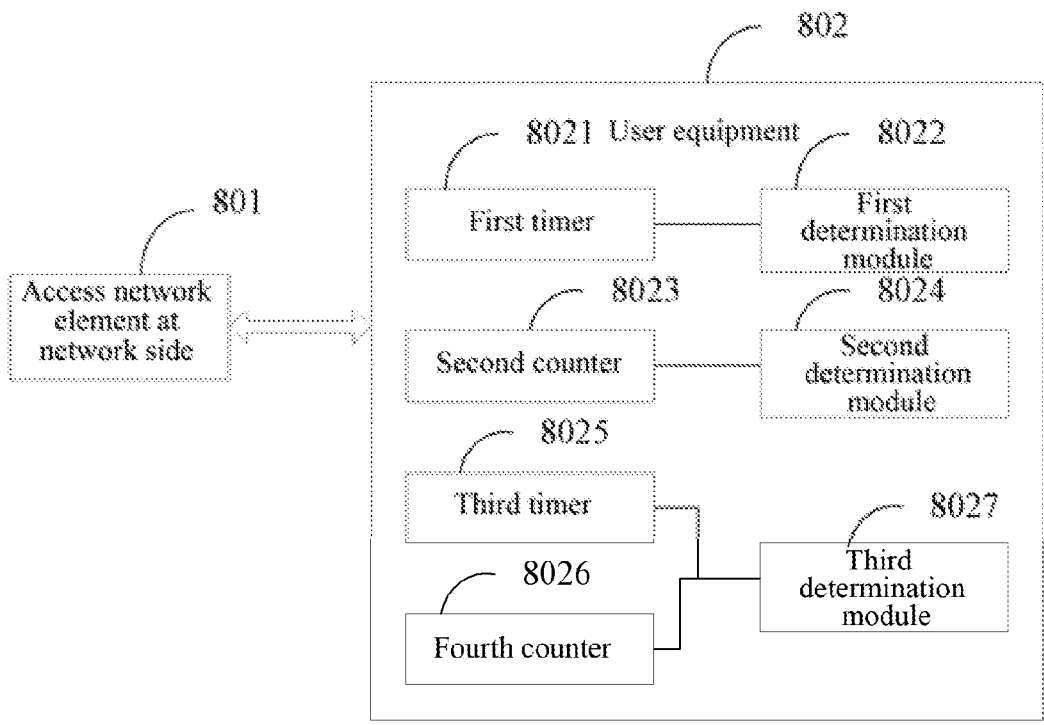
FIG. 8 is a schematic diagram of structure of a system for controlling assistant information of user equipment provided in the example 6 of the present document.

The example of the present document provides a system for controlling assistant information of the user equipment, and a structure of the system is as shown in FIG. 8, which includes:

an access network element at network side 801 and user equipment 802 accessing a network via the access network element at network side;

the access network element at network side 801 is configured to: determine whether it is required to perform control on the user equipment 802 reporting the assistant information according to a load condition of the access network element at network side, and when determining that it is required to perform control on the user equipment 802 reporting the assistant information, configure a control parameter of assistant information for the user equipment 802; and the user equipment 802 is configured to: acquire the control parameter of assistant information configured by the access network element at network side 801, and report the assistant information of the user equipment 802 to the access network element at network side 801.

Preferably, the control parameter of assistant information includes a first preset time span, the assistant information report module being configured to report the assistant information of the user equipment to the network side according to the control parameter of assistant information includes: the user equipment 802 determining whether a time interval from the last transmission of assistant information exceeds the first preset time span when it is required to send the assistant information, when the time interval exceeds the first preset time span, the user equipment 802 sending the assistant information, and when the time interval does not exceed the first preset time span, the user equipment 802 not sending the assistant information; the user equipment 802 includes a first timer 8021 and a first determination module 8022;

the first timer 8021 is configured to: be cleared and restart timing according to the first preset time span when the user equipment 802 sends the assistant information; and the first determination module 8022 is configured to: check a timing situation of the first timer 8021 when it is required to send the assistant information, if the first timer 8021 times out, determine that the user equipment 802 sends the assistant information, and if the first timer 8021 does not time out, determine that the user equipment 802 does not send the assistant information.

Preferably, the first timer 8021 is further configured to: stop timing when the user equipment 802 releases a RRC connection or the user equipment 802 moves to be in other cells during the timing.

Preferably, the first timer 8021 is further configured to: continue timing when the user equipment 802 releases a RRC connection or the user equipment 802 moves to be in other cells during the timing.

Preferably, the control parameter of assistant information also can include a second preset threshold, the assistant information report module being configured to report the assistant information of the user equipment to the network side according to the control parameter of assistant information includes: when the user equipment 802 is in a RRC connection status and it is required to send the assistant information, the user equipment 802 determining whether the number of times of the user equipment having sent the assistant information in the current RRC connection status reaches or exceeds the second preset threshold, when the number of times of having sent the assistant information does not reach the second preset threshold, sending the assistant information, and when the number of times of sending the assistant information reaches or exceeds the second preset threshold, not sending the assistant information; the user equipment 802 also includes a second counter 8023 and a second determination module 8024;

a second counter 8023 is configured to: when the user equipment 802 triggers a RRC connection establishment process, start to count from zero; and a second determination module 8024 is configured to: check a counting situation of the second counter 8023 when it is required to send the assistant information, if a counting result of the second counter 8023 does not reach the second preset threshold, determine that the user equipment 802 sends the assistant information, and if the counting result of the second counter 8023 reaches or exceeds the second preset threshold, determine that the user equipment 802 does not send the assistant information.

Preferably, the second determination module 8024 is further configured to: stop counting when the user equipment 802 establishing the RRC connection fails or the RRC connection of the user equipment 802 is released, or when the user equipment 802 initiates a handover process.

Preferably, the second determination module 8024 is further configured to: continue counting when the user equipment 802 establishing the RRC connection fails or the RRC connection of the user equipment 802 is released, or when the user equipment 802 initiates the handover process.

Preferably, the control parameter of assistant information also includes a third preset time span and a fourth preset threshold, the assistant information report module being configured to report the assistant information of the user equipment to the network side according to the control parameter of assistant information includes: the user equipment 802 determining whether the number of times of the user equipment sending the assistant information within the third preset time span reaches or exceeds the fourth preset threshold when it is required to send the assistant information, when the number of times of sending the assistant information does not reach the fourth preset threshold, sending the assistant information, and when the number of times of sending the assistant information reaches or exceeds the fourth preset threshold, not sending the assistant information; the user equipment 802 also includes a third timer 8205, a fourth counter 8026 and a third determination module 8027;

the third timer 8025 is configured to: be cleared and retime according to the third preset time span when a triggering condition is satisfied, wherein the triggering condition is specifically: timing of the third timer 8025 expires according to the third preset time span, or the user equipment 802 completing an Attach process to establish a connection with a core network, or the user equipment 802 completing a RRC connection process to establish a connection with an access network, or the user equipment 802 starting up, or the user equipment 802 receiving information including the control parameter of assistant information sent by the network side, or reaching a starting time customized by the user equipment 802;

the fourth counter 8026 is configured to: while the third timer 8025 is cleared and retimes, start to count from zero; and the third determination module 8027 is configured to: check a counting situation of the fourth counter 8026 when it is required to send the assistant information, if a counting result of the fourth counter 8026 does not reach the fourth preset threshold, determine to send the assistant information, and if the counting result of the fourth counter 8026 reaches or exceeds the fourth preset threshold, determine not to send the assistant information.

Preferably, the third timer 8025 is further configured to: stop timing when the user equipment 802 initiates a handover process or reselects to be in other cells; and the fourth counter 8026 is further configured to: stop counting when the user equipment 802 initiates the handover process or reselects to be in other cells and the third timer 8025 stops timing.

Preferably, the third timer 8025 is further configured to: continue timing when the user equipment 802 initiates the handover process or reselects to be in other cells; and the fourth counter 8026 is further configured to: continue counting when the user equipment 802 initiates the handover process or reselects to be in other cells.

The user equipment in the example of the present document is specially the UE, which possesses the functions of the device for controlling the assistant information of the user equipment provided in any one of the examples 2 to 4 of the present document; and the access network element at network side in the example of the present document is specially the eNB, which possesses the functions of the device for controlling the assistant information of the user equipment provided in the example 5.

The example of the present document provides a method, device and system for controlling the assistant information of the user equipment, and the user equipment acquires the control parameter of assistant information configured by the network side, and the user equipment reports the assistant information of the user equipment to the network side according to the control parameter of assistant information, which implements that the network side controls the user equipment reporting the assistant information, avoiding that the UE sends the assistant information frequently, and solves the problem that the system efficiency is reduced, for the UE reports the assistant information inappropriately. The method and system for controlling the assistant information of the user equipment provided in the example of the present document are applied to the LTE system and a Universal Mobile Telecommunications System (UMTS) system.

The ordinary person skilled in the art can understand that all or part of steps of the above examples can be implemented by using a flow of computer program, the computer program can be stored in a computer readable memory medium, the computer program is executed in corresponding hardware platforms (such as a system, equipment, device and component and so on), and when the program is carried out, one of the steps or a combination of the steps of the method examples is comprised.

Alternatively, all or part of the steps of the above examples also can be implemented by using integrated circuits, and these steps can be made into multiple integrated circuit modules respectively or multiple modules or steps of them can be made into a single integrated circuit module to be implemented. Therefore, the present document is not limited to any specific combination of hardware and software.

The devices or function modules or function units in the above examples can be implemented through a universal calculating device, and they can be concentrated in a single calculating device or distributed in a network composed of multiple calculating devices.

If implemented in a form of software function module and sold or used as an independent product, the devices or function modules or function units in the above examples can be stored in a computer readable memory medium. The computer readable memory medium mentioned above can be a read-only memory, disk or optical disk and so on.

Any skilled familiar to the art can easily conceive changes and substitutions within the technical scope disclosed by the present document, and these changes and substitutions shall be all covered within the protection scope of the present document. Therefore, the protection scope of the present document should be subject to the protection scope described in the claims.

INDUSTRIAL APPLICABILITY

In the example of the present document, the user equipment acquires the control parameter of assistant information configured by the network side, and the user equipment reports the assistant information of the user equipment to the network side according to the control parameter of assistant information, which implements that the network side controls the user equipment reporting the assistant information, avoiding that the UE sends the assistant information frequently, and solves the problem that the system efficiency is reduced, for the UE reports the assistant information inappropriately. The method and system for controlling the assistant information of the user equipment provided in the example of the present document are applied to the LTE system and the UMTS system.

What is claimed is:

1. A method for controlling assistant information of user equipment, comprising:
   the user equipment acquiring a control parameter of assistant information configured by a network side; and
   the user equipment reporting the assistant information of the user equipment to the network side according to the control parameter of assistant information; wherein
   the control parameter of assistant information includes a second preset threshold;
   the user equipment reporting the assistant information of the user equipment to the network side according to the control parameter of assistant information comprises:
   when the user equipment is in a RRC connection status and needs to send the assistant information, the user equipment determining whether a number of times of the user equipment having sent the assistant information in a current RRC connection status reaches or exceeds the second preset threshold, when the second preset threshold is not reached, sending the assistant information, and when the second preset threshold is reached or exceeded, not sending the assistant information; and/or,
   the control parameter of assistant information includes a third preset time span and a fourth preset threshold;
   the user equipment reporting the assistant information of the user equipment to the network side according to the control parameter of assistant information comprises:
   the user equipment determining whether a number of times of the user equipment sending the assistant information within the third preset time span reaches or exceeds the fourth preset threshold when needing to send the assistant information, when the number of times of sending the assistant information does not reach the fourth preset threshold, sending the assistant information, and when the number of times of sending the assistant information reaches or exceeds the fourth preset threshold, not sending the assistant information.

2. The method for controlling the assistant information of the user equipment according to claim 1, wherein,
   the user equipment reporting the assistant information of the user equipment to the network side according to the control parameter of assistant information further comprises:
   when the user equipment establishing a RRC connection fails or a RRC connection of the user equipment is released, the second counter stopping counting;
   or
   the user equipment reporting the assistant information of the user equipment to the network side according to the control parameter of assistant information further comprises:
   when the user equipment initiates a handover process, the second counter stopping counting, or the second counter continuing counting.

3. The method for controlling the assistant information of the user equipment according to claim 1, wherein
   the user equipment contains a third timer and a fourth counter, the user equipment reporting the assistant information of the user equipment to the network side according to the control parameter of assistant information comprises:
   when a triggering condition is satisfied, the third timer being cleared and retiming according to the third preset time span;
   while the third timer is cleared and retimes, the fourth counter starting to count from zero; and
   the user equipment checking a counting situation of the fourth counter when needing to send the assistant information, if a counting result of the fourth counter does not reach the fourth preset threshold, sending the assistant information, and if the counting result of the fourth counter reaches or exceeds the fourth preset threshold, not sending the assistant information.

4. The method for controlling the assistant information of the user equipment according to claim 3, wherein, the user equipment reporting the assistant information of the user equipment to the network side according to the control parameter of assistant information further comprises:
   when the user equipment initiates a handover process or reselects to be in other cells, the third timer stopping timing, and the fourth counter stopping counting, or the third timer continuing timing and the fourth counter continuing counting.

5. A method for controlling assistant information of user equipment, comprising:
a network side determining whether there is a need to perform control on the user equipment reporting the assistant information according to a load condition of the network side; and
when determining that there is a need to perform control on the user equipment reporting the assistant information, the network side configuring a control parameter of assistant information for the user equipment, and sending the control parameter of assistant information to the user equipment wherein,
the control parameter of assistant information includes a second preset threshold, and the control parameter of assistant information is specifically: when the user equipment is in a RRC connection status and needs to send the assistant information, the user equipment determining whether a number of times of the user equipment having sent the assistant information in a current RRC connection status reaches or exceeds the second preset threshold, when the number of times of having sent the assistant information does not reach the second preset threshold, sending the assistant information, and when the number of times of having sent the assistant information reaches or exceeds the second preset threshold, not sending the assistant information; and/or
the control parameter of assistant information includes a third preset time span and a fourth preset threshold, and the control parameter of assistant information is specifically: the user equipment determining whether a number of times of the user equipment sending the assistant information within the third preset time span reaches or exceeds the fourth preset threshold when needing to send the assistant information, when the number of times of sending the assistant information does not reach the fourth preset threshold, sending the assistant information, and when the number of times of sending the assistant information reaches or exceeds the fourth preset threshold, not sending the assistant information.

6. The method for controlling the assistant information of the user equipment according to claim 5, wherein, the network side determining whether there is a need to perform control on the user equipment reporting the assistant information according to a load condition of the network side comprises:
when a change of load is higher than a preset load threshold, the network side determining that there is a need to perform control on the user equipment reporting the assistant information.

7. The method for controlling the assistant information of the user equipment according to claim 5, wherein, when determining that there is a need to perform control on the user equipment reporting the assistant information, the network side configuring a control parameter of assistant information for the user equipment comprises:
configuring the control parameter of assistant information for the user equipment at a preset moment of sending the control parameter of assistant information; or,
after receiving the assistant information sent by the user equipment, the network side feeding back a rejection indication indicating that wireless parameters are not reconfigured for the user equipment to the user equipment, and configuring the control parameter of assistant information for the user equipment through the rejection indication; or,
after receiving the assistant information sent by the user equipment, the network side feeding back configuration information including reconfigured wireless parameters to the user equipment, and configuring the control parameter of assistant information for the user equipment through the configuration information.

8. A device for controlling assistant information of user equipment, comprising:
a parameter acquisition module, configured to: acquire a control parameter of assistant information configured by a network side; and
an assistant information report module, configured to: report the assistant information of the user equipment to the network side according to the control parameter of assistant information; wherein
the control parameter of assistant information includes a second preset threshold;
the assistant information report module being configured to report the assistant information of the user equipment to the network side according to the control parameter of assistant information comprises: when the user equipment is in a RRC connection status and needs to send the assistant information, determining whether a number of times of the user equipment having sent the assistant information in a current RRC connection status reaches or exceeds the second preset threshold, when the second preset threshold is not reached, sending the assistant information, and when the second preset threshold is reached or exceeded, not sending the assistant information; and/or,
the control parameter of assistant information includes a third preset time span and a fourth preset threshold, the assistant information report module being configured to report the assistant information of the user equipment to the network side according to the control parameter of assistant information comprises: determining whether a number of times of the user equipment sending the assistant information within the third preset time span reaches or exceeds the fourth preset threshold when needing to send the assistant information, when the number of times of sending the assistant information does not reach the fourth preset threshold, sending the assistant information, and when the number of times of sending the assistant information reaches or exceeds the fourth preset threshold, not sending the assistant information.

9. The device for controlling the assistant information of the user equipment according to claim 8, wherein
the assistant information report module comprises:
a second counter, configured to: when the user equipment triggers a RRC connection establishment process, start to count from zero; and
a second determination unit, configured to: check a counting situation of the second counter when needing to send the assistant information, if a counting result of the second counter does not reach the second preset threshold, the user equipment sends the assistant information, and if the counting result of the second counter reaches or exceeds the second preset threshold, the user equipment does not send the assistant information.

10. The device for controlling the assistant information of the user equipment according to claim 9, wherein, the second counter is further configured to: when the user equipment establishing a RRC connection fails or a RRC connection of the user equipment is released, stop counting;
or
the second counter is further configured to: when the user equipment initiates a handover process, stop counting, or continue counting.

11. The device for controlling the assistant information of the user equipment according to claim 8, wherein,
the assistant information report module comprises:
a third timer, configured to: be cleared when a triggering condition is satisfied, and retime according to the third preset time span, wherein the triggering condition includes timing of the third timer expires according to the third preset time span and/or any one or any multiple of following events:
the user equipment completing an Attach process to establish a connection with a core network, the user equipment completing a RRC connection process to establish a connection with an access network, the user equipment starting up, the user equipment receiving information including the control parameter of assistant information sent by the network side, and reaching a time of starting the third timer to start timing customized by the user equipment;
a fourth counter, configured to: while the third timer is cleared and retimes, start to count from zero; and
a third determination unit, configured to: check a counting situation of the fourth counter when needing to send the assistant information, if a counting result of the fourth counter does not reach the fourth preset threshold, send the assistant information, and if the counting result of the fourth counter reaches or exceeds the fourth preset threshold, not send the assistant information.

12. A device for controlling assistant information of user equipment, applied to a network side, comprising:
a control starting module, configured to: determine whether there is a need to perform control on the user equipment reporting the assistant information according to a load condition of the network side;
a configuration execution module, configured to: when the control starting module determines that there is a need to perform control on the user equipment reporting the assistant information, configure a control parameter of assistant information for the user equipment; and
a transmitting module, configured to: send the control parameter of assistant information to the user equipment; wherein
the control parameter of assistant information includes a second preset threshold; the assistant information report module being configured to report the assistant information of the user equipment to the network side according to the control parameter of assistant information comprises: when the user equipment is in a RRC connection status and needs to send the assistant information, determining whether a number of times of the user equipment having sent the assistant information in a current RRC connection status reaches or exceeds the second preset threshold, when the second preset threshold is not reached, sending the assistant information, and when the second preset threshold is reached or exceeded, not sending the assistant information; and/or,
the control parameter of assistant information includes a third preset time span and a fourth preset threshold, the assistant information report module being configured to report the assistant information of the user equipment to the network side according to the control parameter of assistant information comprises: determining whether a number of times of the user equipment sending the assistant information within the third preset time span reaches or exceeds the fourth preset threshold when needing to send the assistant information, when the number of times of sending the assistant information does not reach the fourth preset threshold, sending the assistant information, and when the number of times of sending the assistant information reaches or exceeds the fourth preset threshold, not sending the assistant information.

13. The device for controlling the assistant information of the user equipment according to claim 12, wherein, the control starting module being configured to determine whether there is a need to perform control on the user equipment reporting the assistant information according to a load condition of the network side comprises:
when a change of load is higher than a preset load threshold, determining that there is a need to perform control on the user equipment reporting the assistant information.

14. The device for controlling the assistant information of the user equipment according to claim 12, wherein, the configuration execution module comprises:
a first configuration unit, configured to: configure the control parameter of assistant information for the user equipment at a preset moment of sending the control parameter of assistant information;
a second configuration unit, configured to: after receiving the assistant information sent by the user equipment, feed back a rejection indication indicating that wireless parameters are not reconfigured for the user equipment to the user equipment, and configure the control parameter of assistant information for the user equipment through the rejection indication; and
a third configuration unit, configured to: after receiving the assistant information sent by the user equipment, feed back configuration information including reconfigured wireless parameters to the user equipment, and configure the control parameter of assistant information for the user equipment through the configuration information.

15. The method for controlling the assistant information of the user equipment according to claim 3, wherein
the triggering condition includes: timing of the third timer expires according to the third preset time span; and/or any one or any multiple of following events:
the user equipment completing an Attach process to establish a connection with a core network; or,
the user equipment completing a RRC connection process to establish a connection with an access network; or,
the user equipment starting up; or,
the user equipment receiving information including the control parameter of assistant information sent by the network side; or,
reaching a time of starting the third timer to start timing customized by the user equipment.

16. The device for controlling the assistant information of the user equipment according to claim 11, wherein the third timer is further configured to: when the user equipment initiates a handover process or reselects to be in other cells, stop timing; and the fourth counter is further configured to: when the third timer stops timing, stop counting; or, the third timer is further configured to: when the user equipment initiates the handover process or reselects to be in other cells, continue timing; and the fourth counter is further configured to: when the user equipment initiates the handover process or reselects to be in other cells, continue counting.

* * * * *